United States Patent
Park et al.

(10) Patent No.: US 11,137,478 B2
(45) Date of Patent: Oct. 5, 2021

(54) SYSTEM AND METHOD FOR AIMING RADAR SENSOR ANGLE

(71) Applicants: HYUNDAI MOTOR COMPANY, Seoul (KR); KIA MOTORS CORPORATION, Seoul (KR)

(72) Inventors: Jihoon Park, Suwon-si (KR); Jin Seok Kim, Yongin-si (KR); David Oh, Gunpo-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 470 days.

(21) Appl. No.: 16/174,513

(22) Filed: Oct. 30, 2018

(65) Prior Publication Data

US 2020/0064442 A1 Feb. 27, 2020

(30) Foreign Application Priority Data

Aug. 24, 2018 (KR) .................. 10-2018-0099350

(51) Int. Cl.
*G01S 7/40* (2006.01)
*G01S 13/931* (2020.01)

(52) U.S. Cl.
CPC ............. *G01S 7/4026* (2013.01); *G01S 7/40* (2013.01); *G01S 13/931* (2013.01)

(58) Field of Classification Search
CPC ......... G01S 7/4026; G01S 7/40; G01S 13/931
USPC .......... 342/174, 357.29, 357.46, 357.75, 419
See application file for complete search history.

(56) References Cited

U.S. PATENT DOCUMENTS

| 6,218,981 | B1* | 4/2001 | Uehara | G01S 7/34 |
| | | | | 342/107 |
| 2002/0097181 | A1* | 7/2002 | Chou | G01S 19/24 |
| | | | | 342/357.29 |
| 2004/0051660 | A1* | 3/2004 | Kai | G01S 7/35 |
| | | | | 342/70 |
| 2008/0122690 | A1* | 5/2008 | Wan | G01S 19/05 |
| | | | | 342/357.42 |
| 2013/0321209 | A1* | 12/2013 | Kalliola | G01S 13/825 |
| | | | | 342/419 |

FOREIGN PATENT DOCUMENTS

| JP | 5156556 B2 | 3/2013 |
| JP | 2015-179061 A | 10/2015 |
| KR | 10-1809324 B1 | 12/2017 |

* cited by examiner

*Primary Examiner* — Bo Fan

(57) ABSTRACT

A system for aiming a radar sensor angle which adjusts an angle of the radar sensor mounted on a vehicle entering an inspection line includes: a radar sensor mounted inside a front bumper of the vehicle, a wireless terminal connected to the radar sensor through an in-vehicle communication line and connected to the outside through a repeater, a centering unit for aligning a position of the vehicle by a driving roller based on a reference inspection position of the radar sensor, an array antenna for measuring an intensity of a radar signal transmitted from the radar sensor and detecting a radar center value, and a server detecting an angular error value of the radar sensor by comparing the radar center value with a reference center value of a set mounting specification and transmitting an angular correction value to the radar sensor.

19 Claims, 10 Drawing Sheets

SYSTEM AND METHOD FOR AIMING RADAR SENSOR ANGLE

CROSS-REFERENCE TO RELATED APPLICATION

This application claims priority to and the benefit of Korean Patent Application No. 10-2018-0099350, filed on Aug. 24, 2018, the entire contents of which are incorporated herein by reference.

FIELD

The present disclosure relates to a system and method for aiming a radar sensor angle. More particularly, the present disclosure relates to a system and method for aiming a radar sensor angle.

BACKGROUND

The statements in this section merely provide background information related to the present disclosure and may not constitute prior art.

Generally, a vehicle is equipped with a radar sensor for monitoring the running state of the vehicle in order to secure the driving safety of the driver.

The radar sensor is equipped with advanced driver assistance system (ADAS) such as a collision warning system of the vehicle, an automatic emergency brake (AEB) system, a smart cruise control (SCC) system and a lane departure warning system (LDWS), etc.

Recently, studies on autonomous vehicles have been actively carried out, and interest in utilization of radar sensors is increasing.

FIG. 1 shows a method for checking the mounting state of a conventional radar sensor.

Referring to FIG. 1, the conventional radar sensor is a two-way system mounted on a front portion of the vehicle and transmitting electromagnetic waves to a target board installed in an inspection line of a factory to inspect signals reflected from a reflector target.

However, the conventional inspection method requires a certain distance between the radar sensor and the target board, occupies a large space, requires an electromagnetic wave absorber around the target, and causes defective inspection due to irregular reflection around the target.

FIG. 2 shows a front portion of a vehicle in which a radar sensor is generally mounted.

Referring to FIG. 2, a conventional radar transmits and receives a radar signal through a radar cover mounted in a bumper of a front portion of a vehicle and formed on a grill. Here, the grill is a passage through which air for cooling the engine flows during running of the vehicle, and is considered to be a factor that greatly affects the appearance of the vehicle. Therefore, in recent years, the size of the radar cover installed on the grill is designed to be small in order to improve the merchantability of the vehicle appearance.

However, we have discovered that an assembly error may occur when mounting the radar to a beam module of a front bumper or mounting the radar cover. In this case, a recognition error such as recognition of a corner portion of the radar cover due to a small designed radar cover size may be generated.

The above information disclosed in this Background section is only for enhancement of understanding of the background of the present disclosure and therefore it may contain information that does not form the prior art that is already known to a person of ordinary skill in the art.

SUMMARY

An exemplary form of the present disclosure provides a system and a method for aiming a radar sensor angle which directly receives electromagnetic waves transmitted from a radar sensor of a vehicle through an array antenna in a one-way manner to measure a radar power center and corrects a wrong angle with respect to a reference center value.

According to an exemplary form of the present disclosure, a system for aiming an angle of a radar sensor includes: a radar sensor mounted on a vehicle, a wireless terminal connected to the radar sensor through an in-vehicle communication line and configured to wirelessly communicate through a repeater, a centering unit configured to adjust a position of the vehicle by a driving roller based on a reference inspection position of the radar sensor, an array antenna configured to measure a propagation intensity of a radar signal transmitted from the radar sensor through a plurality of antennas and to detect a radar center value, and a server configured to detect an angular error value of the radar sensor by comparing the radar center value with a reference center value of a set mounting specification and configured to transmit an angular correction value for correcting the angular error value to the radar sensor.

Further, the centering unit may determine an alignment state of the vehicle through a vision sensor, and operate the driving roller back and forth and align the vehicle with the reference inspection position if the vehicle is turned off.

Further, the array antenna may include a vertical panel having a mounting portion coupled with a front end of a robot, a horn antenna having an opening in a form of a trunk tube and arranged in a lattice form on a front surface of the vertical panel, and an image sensor provided at a front center of the vertical panel.

Further, the array antenna may calculate the radar center value based on a ratio of power of a radar signal received from each horn antenna of a plurality of horn antennas.

Further, the array antenna may determine that the radar sensor is normally mounted if the power of the radar signal is measured at a same rate in each horn antenna of the plurality of horn antennas.

Further, the array antenna further includes: a first horn antenna, and a second horn antenna arranged opposite to the first horn antenna wither respect to a line corresponding the reference center value. In particular, a power of the radar signal measured by the first horn antenna increases when an angle of the radar signal increases toward the first horn antenna, and a power of the radar signal measured by the second horn antenna decreases when the angle of the radar signal increases toward the second horn antenna.

Further, the server may include a communication unit connected to the wireless terminal through the plurality of antennas and configured to transmit a control signal for transmitting the radar signal of the radar sensor, an interface unit configured to communicate with the centering unit and to receive a turning angle of the vehicle through a vision sensor, and configured to transmit a control signal for operating the driving roller, a robot control unit configured to move the array antenna to an inspection position through a posture control of the robot, a database configured to match an ID (identification number) of the wireless terminal with a vehicle identification information and configured to store a reference mounting specification of the vehicle mounted with the wireless terminal and an angle measurement of the radar sensor, and a control unit configured to control an overall operation of the respective parts for correcting the angular error of the radar sensor and an angular error in the vehicle inspection line.

Further, the robot control unit may recognize the center of the radar cover of the centered vehicle through the image sensor, and align the center of the array antenna horizontally with respect to the center of the cover through posture control of the robot.

Further, the control unit may determine that a mounting error has occurred if the angular error value is out of the range of self-angle correction by the radar sensor, and bypass the vehicle to a repair process.

Meanwhile, according to an exemplary form of the present disclosure, a method for aiming a radar sensor angle which adjusts an angle of the radar sensor mounted on a vehicle by a server installed at an inspection line include a) connecting wireless communication with a wireless terminal connected to a vehicle network and aligning a vehicle with a reference inspection position of the radar sensor through a centering unit provided on the inspection line, b) positioning an array antenna mounted on a front end of a robot at a set distance from the radar sensor, transmitting a radar signal, and receiving the radar signal through the array antenna, c) comparing received powers of the radar signals measured for each of the horn antennas arranged in a lattice form with the array antenna, and detecting a radar center value through a ratio of received power, and d) detecting an angular error value of the radar sensor by comparing a radar center value measured through the array antenna with a reference center value of a set specification, generating an angular correction value for correcting the angular error value and transmitting the generated angular correction value to the radar sensor through the wireless terminal.

Further, the a) step may include recognizing the alignment state of the vehicle through an upper vision sensor in a state where tires of the vehicle are respectively mounted on driving rollers corresponding to four wheels, and operating the drive roller back and forth to align the vehicle with the reference inspection position if the vehicle is turned to the left or right.

Further, the b) step may include recognizing the center of the radar cover of the centered vehicle through the image sensor installed at the center of the antenna array, and aligning the center of the array antenna horizontally with respect to the center of the cover through posture control of the robot.

Further, the c) step may include measuring the power of the radar signal received at each horn antenna of the horn antennas and then detecting the radar center value through a ratio of the respective measured powers.

Further, the c) step may include determining that the radar sensor is normally mounted if the powers of the radar signals are measured at a same rate in each horn antenna of the horn antennas.

Further, the d) step may include determining that the radar sensor is normally mounted if the angular error value satisfies the set mounting specification.

Further, the d) step may include determining whether the angular error value is within a range that can be self-angle correction by the radar sensor if the angular error value does not satisfy the set mounting specification.

Further, the d) step may include transmitting the angular correction value of the radar sensor to the radar sensor through the wireless terminal if the angular error value is within the range of the self-angle correction by the radar sensor.

Further, after the d) step, the method for aiming a radar sensor angle may further include determining whether a radar sensor angling operation of the vehicle is completed and exiting from the inspection line when a response message indicating completion of correction to the radar sensor correction is received from the radar sensor.

Further, the d) step may include determining that a mounting error has occurred and bypassing the vehicle to a repair process if the angular error value is not within the range of the self-angle correction by the radar sensor.

According to an exemplary form of the present disclosure, the radar sensor receives the radar signal transmitted from the radar sensor through the array antenna, measures the radar center value according to the received power ratio between the antennas, detects and corrects an error angle with respect to the reference center value, therefore can solve the recognition error of the radar sensor and reduce the cost of claim accordingly.

Further, by measuring the center value of the radar signal received from the array antenna by a one-way method, which is not a two-way method for measuring a signal reflected on a conventional radar correction target, therefore the transmission/reception distance of the radar signal can be reduced and the correction target can be omitted, so that the angle of the radar sensor can be simply inspected in a narrow space.

Further, the server of the inspection line automatically controls the radar sensor and peripheral devices of the vehicle, thereby reducing the workload of the final inspection line.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
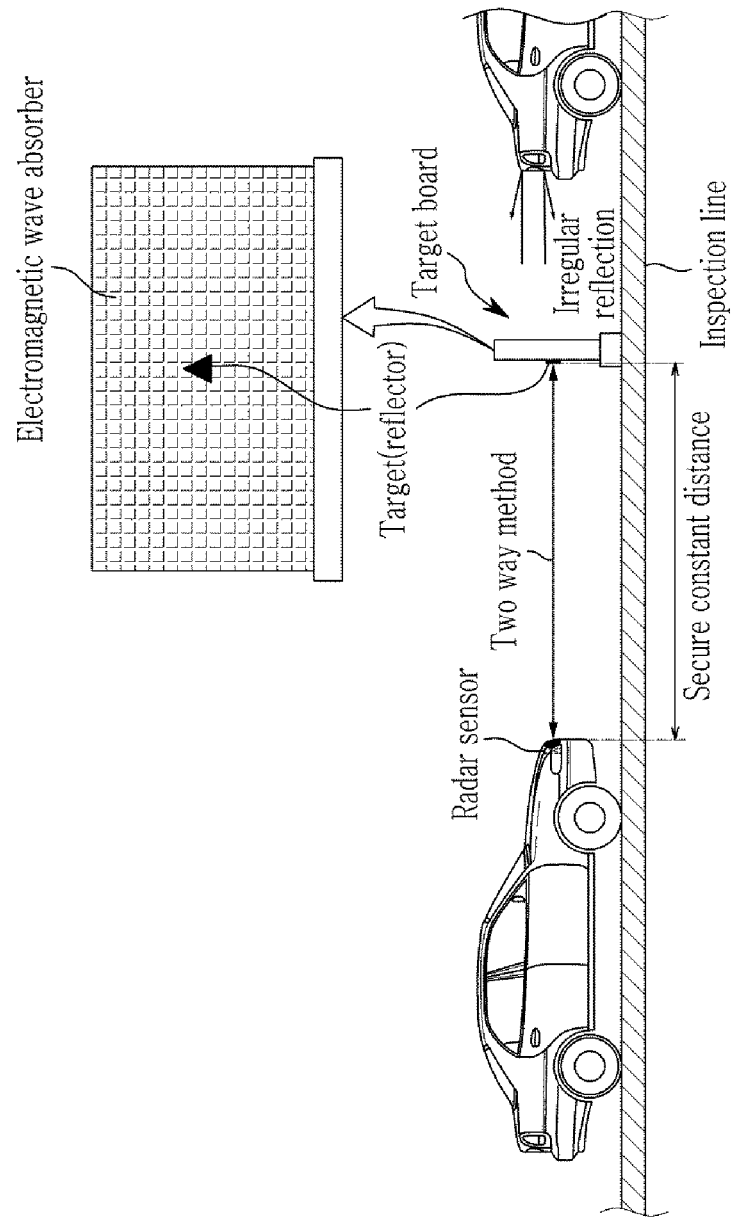
FIG. 1 shows a method of inspecting the mounting state of a conventional radar sensor.
Figure 2:
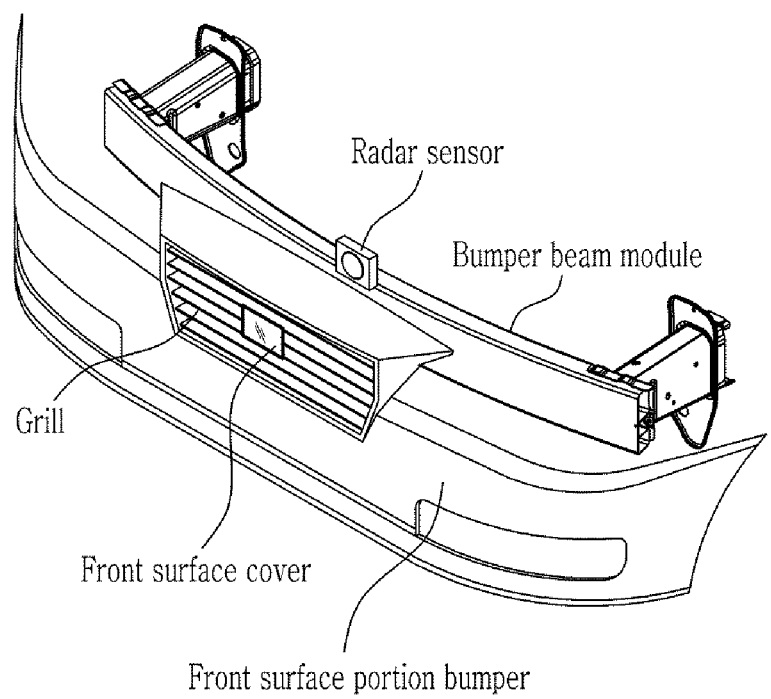
FIG. 2 shows a front portion of a vehicle on which a radar sensor is generally mounted.
Figure 3:
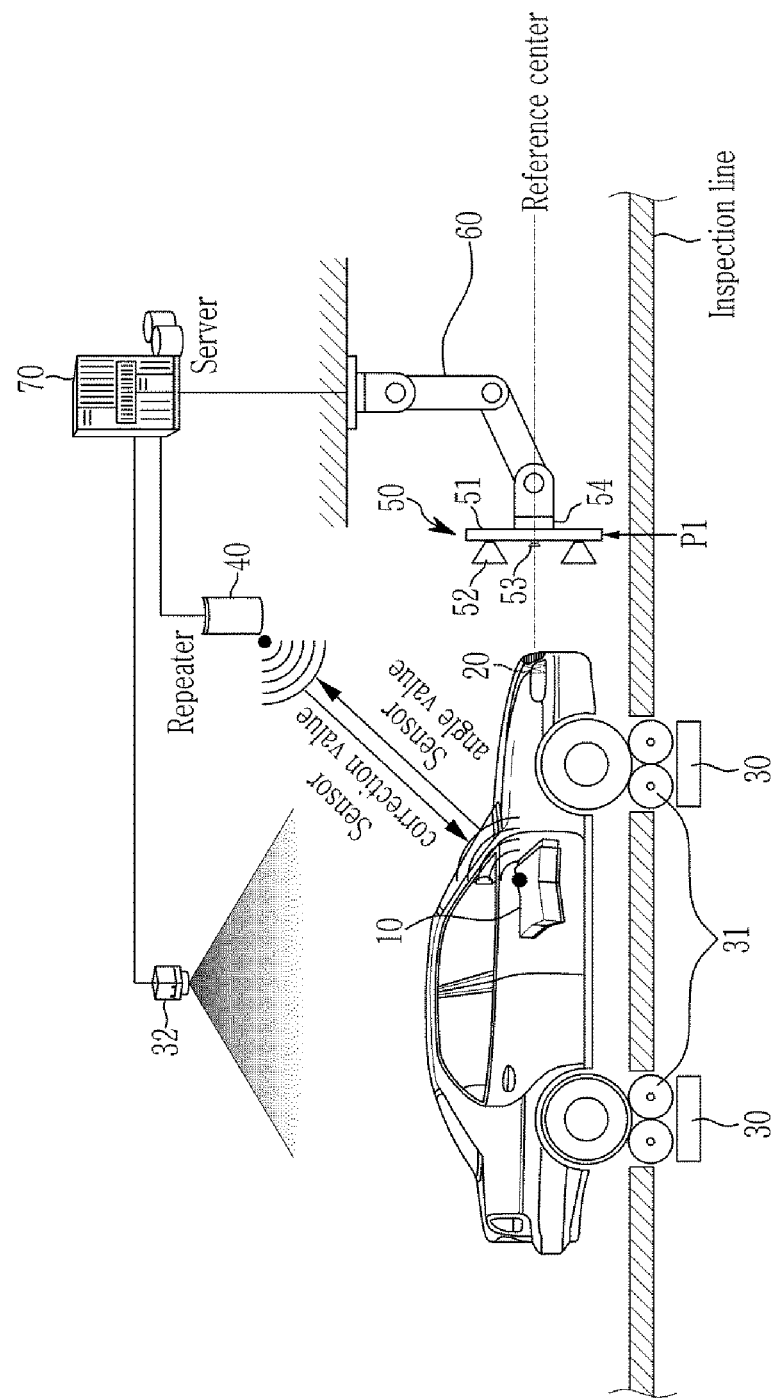
Figure 4:
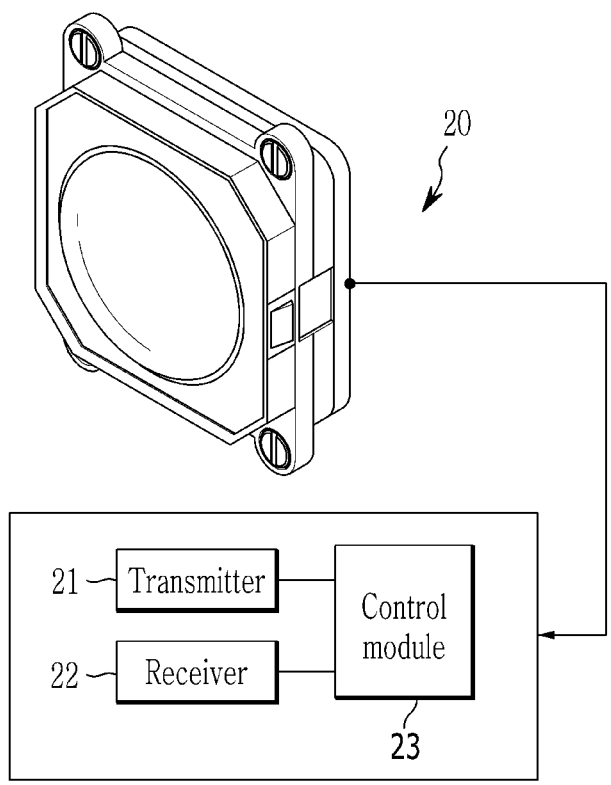
Figure 5:
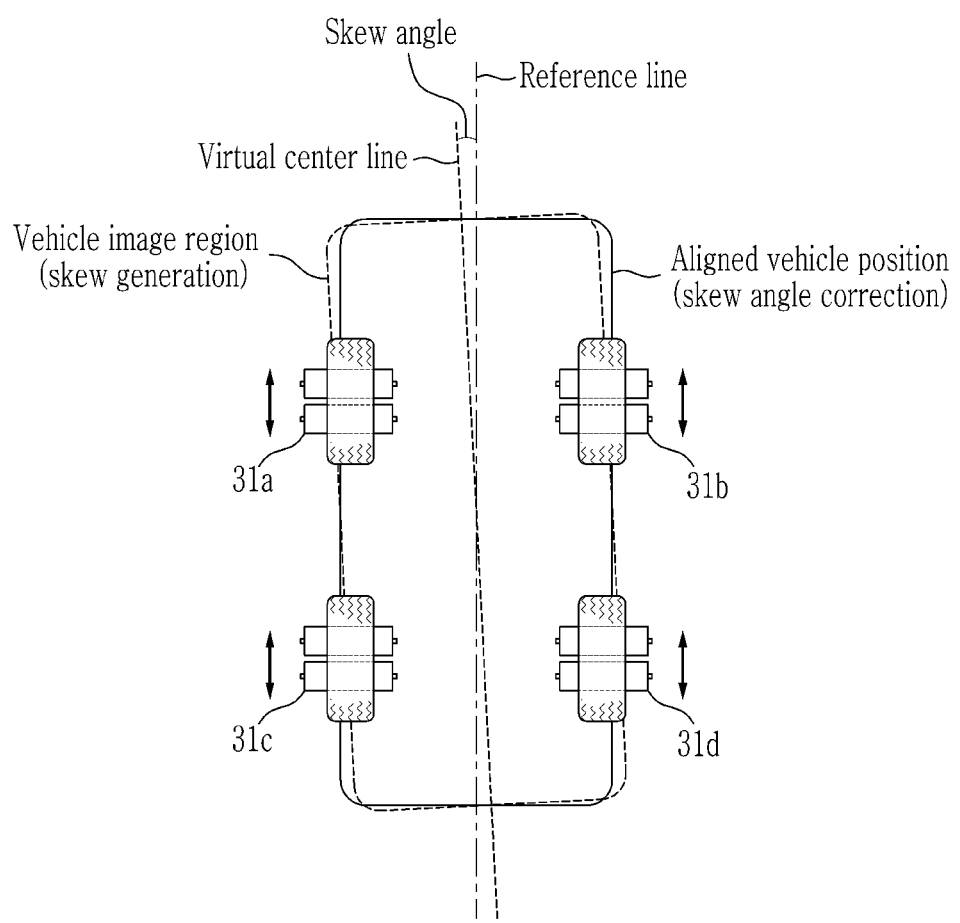
Figure 6:
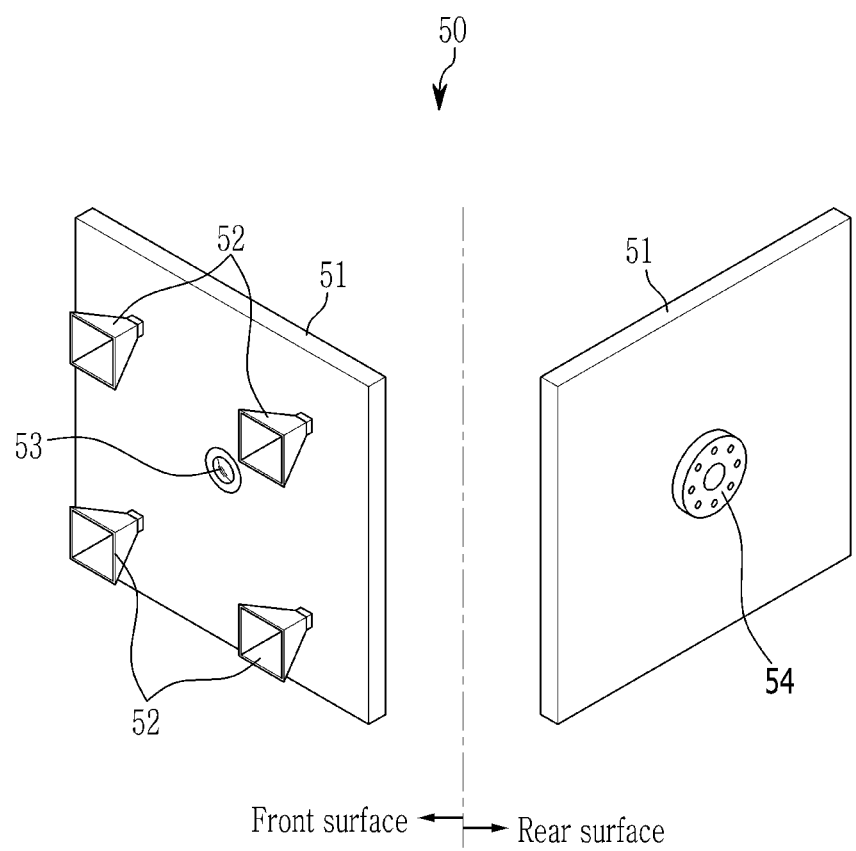
Figure 7:
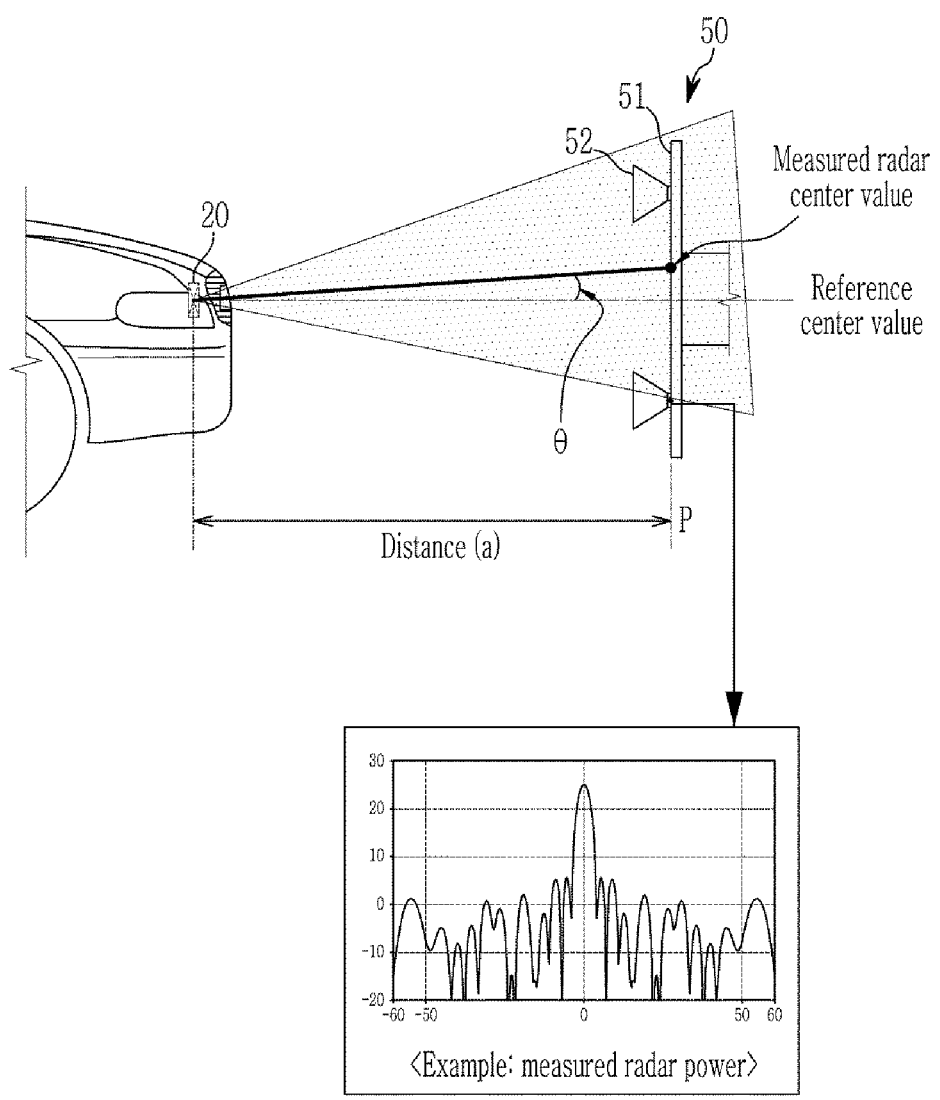
Figure 8:
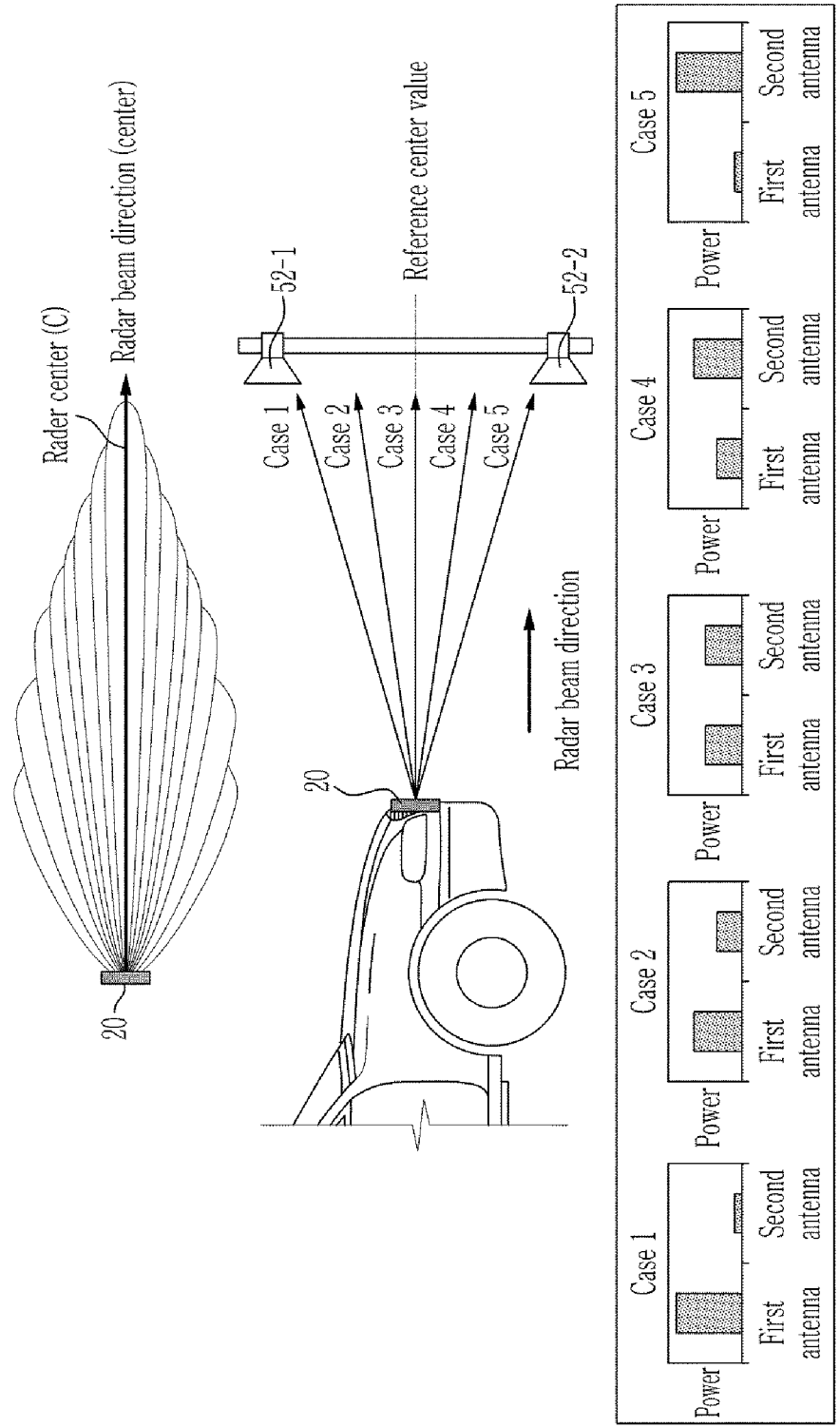
Figure 9:
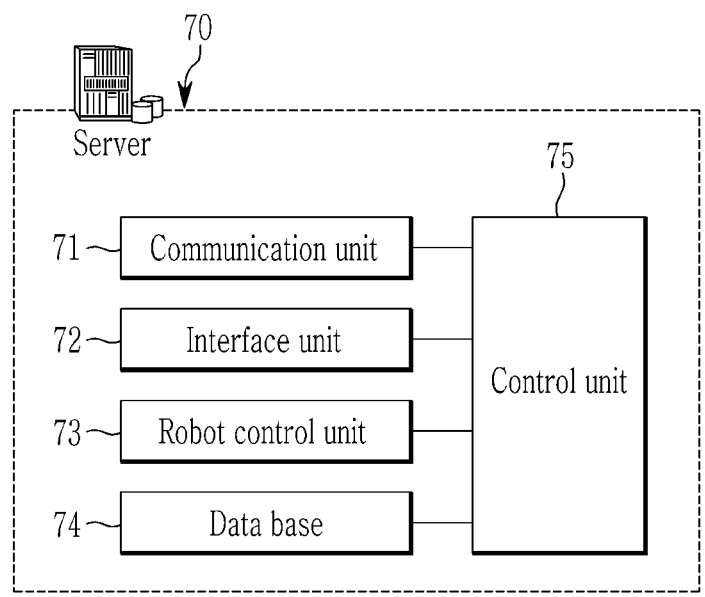
Figure 10:
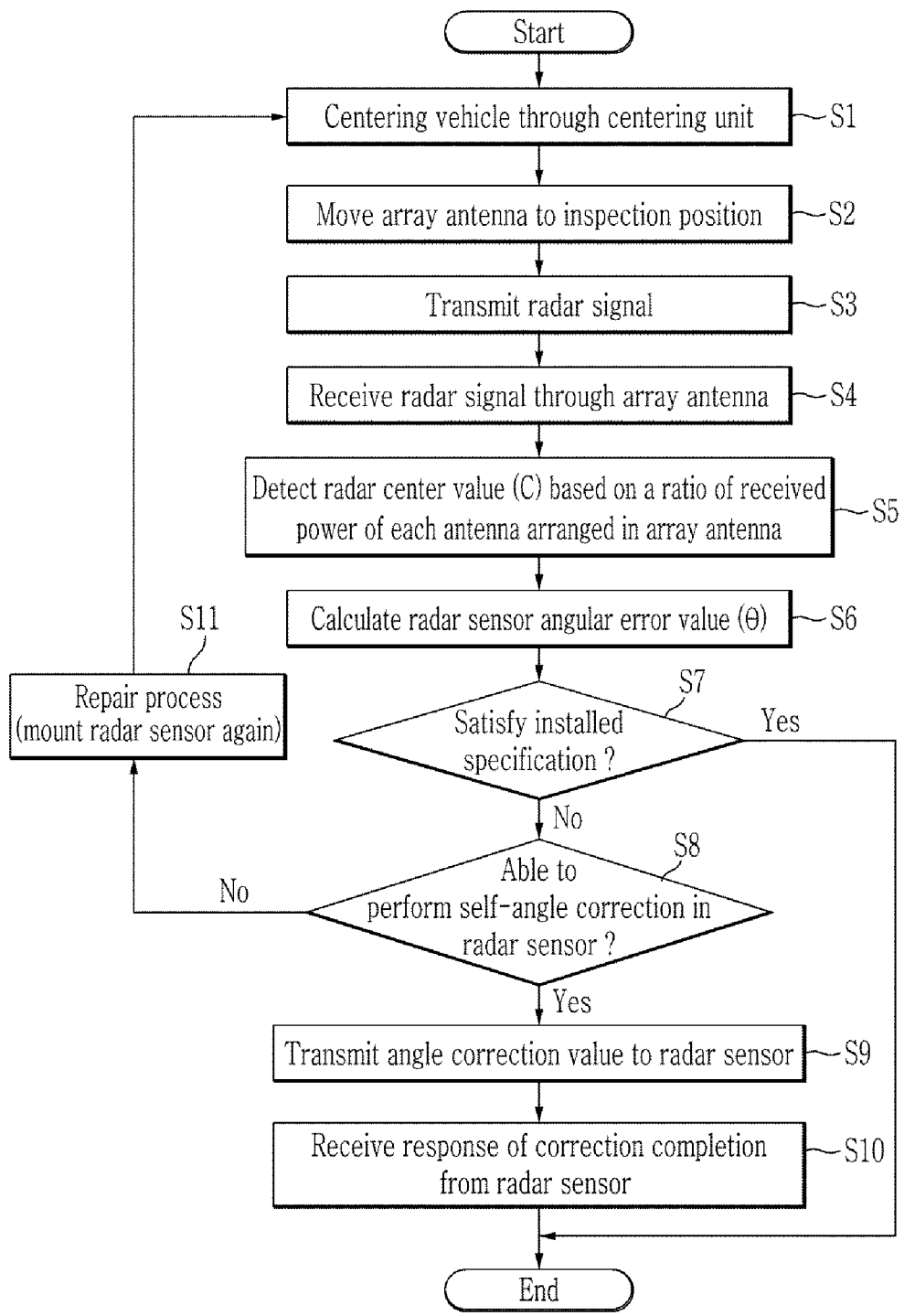

FIG. 3 schematically shows a configuration of a system for aiming a radar sensor angle;

FIG. 4 schematically shows a configuration of a radar sensor;

FIG. 5 shows a vehicle centering method;

FIG. 6 schematically shows a configuration of an array antenna;

FIG. 7 shows a radar sensor angle inspection method using an array antenna;

FIG. 8 shows a radar center measurement method;

FIG. 9 is a block diagram schematically showing the configuration of a server; and FIG. 10 is a flowchart schematically showing a method of inspecting a vehicle radar.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As those skilled in the art would realize, the described forms may be modified in various different ways, all without departing from the spirit or scope of the present disclosure. Accordingly, the drawings and description are to be regarded as illustrative in nature and not restrictive.

In addition, unless explicitly described to the contrary, the word "comprise" or variations such as "comprises" or "comprising" will be understood to imply the inclusion of stated elements but not the exclusion of any other elements. In addition, the terms "-er", "-or" and "module" described in the specification mean units for processing at least one function and operation and can be implemented by hardware components or software components and combinations thereof.

A system and method for aiming a radar sensor angle according to an exemplary form of the present disclosure will now be described in detail with reference to the drawings.

FIG. 3 schematically shows a configuration of a system for aiming a radar sensor angle according to an form of the present disclosure.

Referring to FIG. 3, a system for aiming a radar sensor angle includes a wireless terminal 10, a radar sensor 20, a centering unit 30 installed on a vehicle inspection line, a repeater 40, an array antenna 50, a robot 60, and a server 70.

The wireless terminal 10 is mounted on a vehicle which is moved along an inspection line, and each unique ID and vehicle identification information are matched.

The radar sensor 20 is mounted inside a front bumper of the vehicle and connected to a communication line with an electronic control unit (ECU) (not shown).

The wireless terminal 10 may be connected to the in-vehicle communication line through a connector to communicate directly with the radar sensor 20 or with the radar sensor 20 via the vehicle control unit.

The wireless terminal 10 may be configured as a wireless On-Board Diagnostic (OBD) and transmits a control signal (On/Off) for transmitting a test electromagnetic wave (hereinafter, referred to as a radar signal) from the server 70 through the repeater 40. to the radar sensor 20.

The repeaters 40 may be arranged in a plurality of inspection lines. The repeater 40 operates as an AP (access point) that recognizes the wireless terminal 10 through a wireless signal and transmits data received through the wireless terminal ID to the server 70.

The wireless terminal 10 receives the sensor correction value from the server 70 when an error occurs in the transmission angle of the radar signal of the radar sensor 20 and transmits the sensor correction value to the radar sensor 20, and transmits the sensor angle value to the server 70.

FIG. 4 schematically shows a configuration of a radar sensor according to an exemplary form of the present disclosure.

Referring to FIG. 4, the radar sensor 20 includes a transmitter 21 for forwarding a radio wave in accordance with a radar signal, a receiver 22 for receiving a radar signal reflected by an object, and a control module (MCU) 23 for analyzing the reflected radar signal and measuring distance, velocity and angle to the front object.

The radar sensor 20 can set the sensor angle value at which the radar signal is transmitted through the control module 23 and can adjust the sensor angle according to the sensor correction value received from the server 70. For example, the adjustment of the sensor angle can be adjusted by a software method of setting an offset according to the sensor correction value.

Therefore, since the sensor angle can be corrected in the state that the radar sensor 20 is mounted on the vehicle, it is possible to omit the repair process in which the radar sensor 20 is detached and re-mounted for angle correction (adjustment). However, the exemplary form of the present disclosure is not limited to this, and may be controlled by a mechanical method through a mechanism for finely adjusting the angles of the transmitter and the receiver.

The centering unit 30 aligns the position of the vehicle with the driving roller 31 to match the reference inspection position of the radar sensor 20.

When the tire of the vehicle is placed on the driving roller 31, the centering unit 30 grasps the alignment state of the vehicle through the upper vision sensor 32, and if the vehicle is turned to the left or right, the drive roller 31 may be operated back and forth so that the vehicle is aligned with the reference inspection position.

For example, FIG. 5 illustrates a vehicle centering method according to an exemplary form of the present disclosure.

Referring to FIG. 5, the centering unit 30 calculates a skew angle of the vehicle by extracting a virtual center line from a vehicle image area photographed through the vision sensor 32 and comparing the virtual center line with a reference line of the reference inspection position. At least one of the driving rollers 31a to 31d corresponding to the four wheels is driven in the forward and backward directions to adjust the centerline to fit the reference line, thereby correcting the angle of the vehicle. In normal vehicle centering, two rollers on which the tires are mounted may be arranged in units of the front wheel and the rear wheel, but four centering portions 30 may be disposed for adjusting the angle.

The array antenna 50 measures the propagation intensity of a radar signal transmitted from the radar sensor 20 through a plurality of antennas disposed at the front end of the robot 60, and recognizes the radar power center point as the radar power center.

FIG. 6 schematically shows a configuration of an array antenna according to an exemplary form of the present disclosure.

Referring to FIG. 6, the array antenna 50 includes a vertical panel 51, a plurality of horn antennas 52 disposed on the front surface of the vertical panel 51, an image sensor 53 installed at a center of the front surface and a mounting portion 54 provided on the rear surface of the vertical panel 51 and coupled with the front end of the robot 60.

The horn antenna 52 has an opening in the form of a trunk tube and may be arranged on the vertical panel 51 in the form of a lattice including a plurality of rows and columns. In FIG. 6, two horn antennas 52 are mounted on the vertical panel 51 in rows and columns, respectively. However, the number of horn antennas 52 is not limited to this and can be further increased.

The horn antennas 52 arranged in a plurality of rows can be utilized to detect a mounting error interval and a mounting error angle in the vertical direction of the radar sensor 20. In addition, the horn antennas 52 arranged in the plurality of rows can be utilized to detect mounting error intervals and mounting error angles in the lateral direction of the radar sensor 20.

FIG. 7 shows a radar sensor angle inspection method using an array antenna according to an exemplary form of the present disclosure.

Referring to FIG. 7, the array antenna 50 in which two or more horn antennas 52 are arranged in the vertical direction is positioned at the inspection position P separated from the radar sensor 20 by a set distance a and the radar signal is transmitted, and the measured radar center value C is detected. The set distance (a) is a distance that can be measured even within 1 m, for example.

The array antenna 50 measures the power of the electromagnetic wave radiated from the radar sensor 20 for each of the horn antennas 52 and combines them to detect the most strongly measured radar center value C.

For example, FIG. 8 shows a radar center measurement method according to an exemplary form of the present disclosure.

Referring to FIG. 8, the power measurement result received from the first horn antenna 52-1 and the second horn antenna 52-2 arranged vertically of the array antenna 50 according to the angular cases (Case 1 to Case 5) of the radar signal transmitted from the radar sensor 20 is shown.

The radar signal emitted from the radar sensor 20 has the strongest power at the center of the radar beam direction, and the power is weaker as it goes out of the center. Therefore, when the angles of the radar signals are directed toward the center of the array antenna 50, the horn antennas 52 arranged in the form of a lattice at the same distance with respect to the center of the array antenna 50 must have the same ratio of power.

The array antenna 50 measures the power of the radar signal received from each of the horn antennas 52-1 and 52-2, calculates the radar center value C through the ratio of the respective measured powers, and determines whether or not the angle is changed.

In the case of Case 1 to Case 5, for example, a state in which the first horn antenna 52-1 and the second horn antenna 52-2 are vertically arranged and the radar signal is transmitted at various angles is shown.

First, when power is measured at the same ratio in the first horn antenna 52-1 and the second horn antenna 52-2 as in Case 3, a radar signal coinciding with the reference center value corresponding to the mounting specification of the radar sensor 20 is transmitted. At this time, the reference center value corresponds to the center of the array antenna 50. The radar sensor 20 can be determined as normally mounted because the radar center value C measured by the received power ratio between the antennas coincides with the reference center value.

On the other hand, Case 1, Case 2, and Case 4 except for Case 3 indicate that the angle of the radar signal is wrong.

The power measured by the first horn antenna 52-1 is relatively increased and the power measured by the second horn antenna 52-2 is relatively decreased as the angle of the radar signal is increased toward the upper direction as in Case 2 and Case 1 compared to normal Case 3.

On the contrary, the power measured by the first horn antenna 52-1 is relatively decreased and the power measured by the second horn antenna 52-2 is relatively increased as the angle of the radar signal is increased toward the lower direction as in Case 4 and Case 5 compared to normal Case 3.

At this time, in the case of Case 1, Case 2, Case 3, and Case 4, when the measured radar center value C is compared with the reference center value of the sensor mounting specification, the angular error value θ of the radar sensor 20 can be detected as shown in FIG. 7. Here, the angular error value θ has an error as an angular error based on the reference center value of the sensor mount specification and has a meaning as a correction value for matching the radar center value C with the reference center value.

The radar sensor angle inspection method of the present disclosure is a one-way method of deriving the correction angle directly from the value received by the array antenna 50 which is different from conventional two-way method that corrects the angle of the radar sensor by confirming the reflected value from radar correction target at a far distance in front of the vehicle during radar measurement inspection.

Meanwhile, in the above description, the method of calculating the error by measuring the vertical angle of the radar sensor 20 through the horn antenna 52 arranged above and below the array antenna 50 has been mainly described. In this case, it is obvious that the error of the left and right angles of the radar sensor 20 can be measured through the horn antenna 52 arranged in the left and right direction, so duplicate description will be omitted.

As described above, the array antenna 50 can be inspected at the inspection position P within 1 m from the radar sensor 20. Therefore, there is an advantage that the inspection space can be reduced compared with the conventional radar measurement inspection method.

In addition, it is possible to omit the electromagnetic wave absorber provided in the conventional radar correction target and to reduce the installation cost, and even when the array antenna 50 is moved during the radar signal transmission, the radar power center can be measured in real time.

The server 70 is a computer equipment for controlling the overall operation of each of the above-described respective components in a system for aiming a radar sensor of a vehicle according to an exemplary form of the present disclosure.

FIG. 9 is a block diagram schematically showing the configuration of a server according to an exemplary form of the present disclosure.

Referring to FIG. 9, the server 70 includes a communication unit 71, an interface unit 72, a robot control unit 73, a database 74, and a control unit 75.

The communication unit 71 is connected to the wireless terminal 10 of the vehicle through an antenna and transmits a control signal (On/Off) for transmitting the radar signal of the radar sensor 20.

In addition, the communication unit 71 can transmit the sensor correction value to the radar sensor 20 when the mounting error of the radar sensor 20 is generated, and can receive the response in which the sensor correction is completed.

The interface unit 72 connects the server 70 and peripheral devices installed in the vehicle radar inspection process so that they can be interlocked with each other.

The interface unit 72 connects the communication with the centering unit 30 so that the server 70 can grasp the angle of the vehicle through the vision sensor 32 and control the centering of the vehicle by the operation of the driving roller 31.

The robot control unit 73 stores kinematic information for controlling the posture of the robot 60 and positions the array antenna 50 at the inspection position P through posture control of the robot.

The robot control unit 73 recognizes the center of the radar cover of the centered vehicle through the image sensor 53 and detects the center of the array antenna 50 based on the center of the cover through the posture control of the robot 60.

The database 74 stores various data and programs for angle inspection and correction of the radar sensor 20, and stores data generated when the vehicle-specific radar sensor 20 angle-checking is performed.

For example, the database 74 stores the radar sensor mounting position in the design drawing for each different vehicle, and stores centering information for each different vehicle, reference mounting specification information for each different vehicle, inspection position (P) setting information of the array antenna 50, and the like. In addition, the ID of the wireless terminal 10 and the vehicle identification information are matched and stored, and the result of the radar sensor angle inspection of the vehicle on which the wireless terminal 10 is mounted can be stored.

The control unit 75 is a central processing unit for controlling the overall operation of the respective units for correcting angular errors and angular errors of a radar sensor mounted on a vehicle.

In FIGS. 7 and 8, the control unit 75 measures the radar center value C through the array antenna 50 and determines whether or not the radar center value C is normal. The control unit 75 generates an angle correction value for correcting the angular error value θ in which the angular error of the radar sensor 20 is detected, and transmits the generated angle correction value through the wireless terminal 10.

The control unit 75 further determines whether the angular error value is within a range that can be corrected by the radar sensor 20 itself. If the angular error cannot be corrected, the control unit 75 bypasses the vehicle to the repair process, and the radar sensor 20 is mounted again.

On the other hand, a method for aiming a radar sensor angle according to an exemplary form of the present disclosure will be described with reference to FIG. 10 based on the above-described configuration of the system for aiming a radar sensor angle.

However, since the components of the server 70 described above can be integrated or further subdivided, in the following description of the method for aiming the radar sensor angle in one form of the present disclosure, the server 70 will be mainly described.

FIG. 10 is a flowchart schematically showing a method of inspecting a vehicle radar according to an form of the present disclosure.

Referring to FIG. 10, the server 70 connects the communication with the wireless terminal 10 of the vehicle that has entered the inspection line and aligns the reference inspection position of the radar sensor through the centering unit 30 at S1. At this time, the server 70 grasps the alignment state of the vehicle through the upper vision sensor 32 in a state where the tire of the vehicle is seated on the driving roller 31. If the vehicle is turned to the left or right, the drive roller 31 may be operated back and forth so that the vehicle is aligned with the reference inspection position.

The server 70 moves the array antenna 50 to the inspection position P spaced a distance from the radar sensor 20 of the vehicle through the posture control of the robot 60 at step S2.

The server 70 transmits a control signal for transmitting the radar signal through the wireless terminal 10 of the vehicle to transmit the radar signal of the radar sensor 20 at step S3, and receives the radar signal through the array antenna 50 S4.

The server 70 compares the received power of the radar signals measured for each of the horn antennas 52 arranged in a lattice form with the array antenna 50 and detects the radar center value C based on the ratio of the received power S5.

The server 70 compares the detected radar center value C with a set reference center value and calculates an angular error value θ with respect to the reference center value S6.

The server 70 determines that the radar sensor 20 is normally mounted and ends the inspection if the angle error value θ satisfies the allowable range of the set installed specification S7 (YES). That is, when the angular error value satisfies the set range allowed based on the set reference center value, it is determined that the angular error value is normal.

On the other hand, if it is determined in step S8 that the angular error value θ does not satisfy the set specification S7 (NO), the server 70 determines whether the angular error value θ is in a range where the radar sensor 20 can perform self-angle correction S8.

At this time, the server 70 generates a radar sensor correction value for correcting the angular error value θ if the angular error value θ is within a range that can be corrected by the radar sensor 20 S8 (YES) and transmits it to the radar sensor 20 through the terminal 10 S9.

Thereafter, when the server 70 receives a response of correction completion from the radar sensor 20, the control unit 70 determines that the radar sensor angling operation of the vehicle is completed and permits the vehicle to depart from the inspection line S10.

On the other hand, if it is determined in step S8 that the angular error value θ is not within the range that can be corrected by the radar sensor 20 S8 (NO), the server 70 determines that a mounting error has occurred, and the bumper is detached and the radar sensor is mounted again S11.

Like this, according to an exemplary form of the present disclosure, the radar sensor receives the radar signal transmitted from the array antenna, measures the radar center value according to the received power ratio between the antennas, detects and corrects an error angle with respect to the reference center value, therefore can solve the recognition error of the radar sensor and reduce the cost of claim accordingly.

Further, by measuring the center value of the radar signal received from the array antenna by a one-way method, which is not a two-way method for measuring a signal reflected on a conventional radar correction target, therefore the transmission/reception distance of the radar signal can be reduced and the correction target can be omitted, so that the angle of the radar sensor can be simply inspected in a narrow space.

Further, the server of the inspection line automatically controls the radar sensor and peripheral devices of the vehicle, thereby reducing the workload of the final inspection line.

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the present disclosure.

DESCRIPTION OF SYMBOLS

| | |
|---|---|
| 10: wireless terminal | 20: radar sensor |
| 30: centering unit | 40: repeater |
| 50: array antenna | 51: vertical panel |
| 52: horn antenna | 53: image sensor |
| 54: mounting portion | 60: robot |
| 70: server | 71: communication unit |
| 72: interface unit | 73: robot control unit |
| 74: database | 75: control unit |

What is claimed is:

1. A system for aiming an angle of a radar sensor, the system comprising:
a radar sensor mounted on a vehicle;
a wireless terminal connected to the radar sensor through an in-vehicle communication line and configured to wirelessly communicate through a repeater;
a centering unit configured to adjust a position of the vehicle by a driving roller based on a reference inspection position of the radar sensor;
an array antenna including a plurality of antennas each configured to measure a propagation intensity of a radar signal transmitted from the radar sensor, wherein the array antenna is configured to calculate a radar center value based on the measured propagation intensity of the radar signal; and
a server configured to detect an angular error value of the radar sensor by comparing the radar center value with a reference center value of the array antenna and configured to transmit an angular correction value for correcting the angular error value to the radar sensor.

2. The system of claim 1, wherein the centering unit is configured to:
determine an alignment state of the vehicle through a vision sensor, operate the driving roller back and forth, and align the vehicle with the reference inspection position when the vehicle is turned off.

3. The system of claim 1, wherein
the array antenna includes:
a vertical panel having a mounting portion coupled with a front end of a robot; and
an image sensor provided at a front center of the vertical panel.

4. The system of claim 3, wherein:
the plurality of antennas are a plurality of horn antennas each having an opening in a form of a trunk tube,
horn antennas of the plurality of horn antennas are arranged in a lattice form on a front surface of the vertical panel, and
the array antenna is configured to calculate a ratio of power of the radar signal received from each horn antenna of the plurality of horn antennas so as to calculate the radar center value.

5. The system of claim 4, wherein
the array antenna is configured to determine that the radar sensor is normally mounted when the power of the radar signal is measured at a same rate in each horn antenna of the plurality horn antennas.

6. The system of claim 4, wherein
the plurality of horn antennas includes:
a first horn antenna; and
a second horn antenna arranged opposite to the first horn antenna wither respect to a line corresponding the reference center value,
wherein a power of the radar signal measured by the first horn antenna increases when an angle of the radar signal increases toward the first horn antenna, and a power of the radar signal measured by the second horn antenna decreases when the angle of the radar signal increases toward the second horn antenna.

7. The system of claim 1, wherein the server includes:
a communication unit connected to the wireless terminal through the plurality of antennas and configured to transmit a control signal for transmitting the radar signal of the radar sensor;
an interface unit configured to communicate with the centering unit and to receive a turning angle of the vehicle through a vision sensor, and configured to transmit a control signal for operating the driving roller;
a robot control unit configured to move the array antenna to an inspection position through a posture control of the robot;
a database configured to match an identification (ID) of the wireless terminal with a vehicle identification information, and configured to store reference mounting information of the vehicle mounted with the wireless terminal and an angle measurement of the radar sensor; and
a control unit configured to control an overall operation of respective parts for correcting the angular error of the radar sensor and an angular error in a vehicle inspection line.

8. The system of claim 7, wherein the robot control unit is configured to:
recognize a center of a radar cover of the vehicle through an image sensor, and
align a center of the array antenna horizontally with respect to the center of the cover through the posture control of the robot.

9. The system of claim 8, wherein the control unit is configured to:
determine a mounting error when the angular error value is out of a range of self-angle correction by the radar sensor, and
bypass the vehicle to a repair process.

10. A method for aiming an angle of a radar sensor, where the method adjusts an angle of the radar sensor mounted on a vehicle by a server installed at an inspection line, the method comprising:
connecting wireless communication with a wireless terminal connected to a vehicle network and aligning the vehicle with a reference inspection position of the radar sensor through a centering unit provided on the inspection line;
positioning an array antenna mounted on a front end of a robot at a set distance from the radar sensor;
sending, by the radar sensor, a radar signal to the array antenna including a plurality of horn antennas;
receiving, by the plurality of horn antennas, the radar signal;
comparing, by the array antenna, received powers of the radar signals measured by each horn antenna of the plurality of horn antennas arranged in a lattice form, and detecting a radar center value based on a ratio of the received powers of the radar signals by the plurality of horn antennas; and
calculating, by the server, an angular error value of the radar sensor by comparing the radar center value with a reference center value of the array antenna, generating an angular correction value for correcting the angular error value and transmitting the generated angular correction value to the radar sensor through the wireless terminal.

11. The method of claim 10, wherein the connecting wireless communication includes:
recognizing an alignment state of the vehicle through an upper vision sensor in a state where tires of the vehicle are respectively mounted on driving rollers corresponding to four wheels of the vehicle; and
operating the driving rollers back and forth to align the vehicle with the reference inspection position when the vehicle is turned to left or right.

12. The method of claim 10, wherein the positioning an array antenna includes:
recognizing a center of a radar cover of the vehicle through an image sensor installed at a center of the antenna array, and aligning the center of the array antenna horizontally with respect to the center of the cover through a posture control of the robot.

13. The method of claim 10, wherein the comparing received powers of the radar signals includes:
measuring the powers of the radar signals received at each horn antenna of the plurality of horn antennas and then detecting the radar center value through the ratio of the respective measured powers.

14. The method of claim 13, wherein the comparing received powers of the radar signals includes
determining that the radar sensor is normally mounted when the powers of the radar signals are measured at a same rate in each horn antenna of the plurality of horn antennas.

15. The method of claim 13, wherein the detecting an angular error value of the radar sensor includes
determining that the radar sensor is normally mounted when the angular error value satisfies a predetermined mounting value.

16. The method of claim 13, wherein the detecting an angular error value of the radar sensor includes
determining whether the angular error value is within a range of a self-angle correction by the radar sensor when the angular error value does not satisfy a predetermined mounting value.

17. The method of claim 16, wherein the detecting an angular error value of the radar sensor includes
transmitting the angular correction value to the radar sensor through the wireless terminal when the angular error value is within the range of the self-angle correction by the radar sensor.

18. The method of claim 10, further comprising:
after the detecting the angular error value of the radar sensor,
determining whether a radar sensor angling operation of the vehicle is completed; and
exiting from the inspection line when a response message indicating completion of correction to the radar sensor correction is received from the radar sensor.

19. The method of claim 16, wherein the detecting an angular error value of the radar sensor includes
determining that a mounting error has occurred; and
bypassing the vehicle to a repair process when the angular error value is not within the range of the self-angle correction by the radar sensor.

* * * * *